(12) United States Patent
Hutchens

(10) Patent No.: US 6,494,279 B1
(45) Date of Patent: Dec. 17, 2002

(54) BATTERY ENCLOSURE SYSTEM FOR MOTIVE POWER IN HAZARDOUS SERVICE ENVIRONMENTS

(75) Inventor: John D. Hutchens, Lee's Summit, MO (US)

(73) Assignee: GNB Technologies, Inc., Lombard, IL (US)

( * ) Notice: Subject to any disclaimer, the term of this patent is extended or adjusted under 35 U.S.C. 154(b) by 334 days.

(21) Appl. No.: 09/096,145

(22) Filed: Jun. 11, 1998

(51) Int. Cl.[7] .......................... B60R 16/04; B60K 1/04; B66F 9/06
(52) U.S. Cl. ...................... 180/68.5; 180/65.1; 187/222
(58) Field of Search ............................. 180/68.5, 65.1; 187/222; 429/96, 97, 99, 100; 200/50.19, 50.03

(56) References Cited

U.S. PATENT DOCUMENTS

| | | | | |
|---|---|---|---|---|
| 3,655,926 A | * | 4/1972 | Meermans | 200/50.19 |
| 4,074,785 A | * | 2/1978 | Masevice | 180/68.5 |
| 4,108,266 A | * | 8/1978 | Wojtyna | 180/68.5 |
| 4,991,674 A | * | 2/1991 | Fullenkamp | 180/68.5 |
| 5,293,951 A | * | 3/1994 | Scott | 180/68.5 |
| 5,297,645 A | * | 3/1994 | Eckersley et al. | 180/68.5 |
| 5,437,939 A | * | 8/1995 | Beckley | 180/68.5 |
| 5,441,123 A | * | 8/1995 | Beckley | 180/68.5 |
| 5,520,258 A | * | 5/1996 | Kemshall | 180/68.5 |
| 5,643,693 A | * | 7/1997 | Hill et al. | 429/121 |
| 5,645,448 A | * | 7/1997 | Hill | 439/522 |
| 5,709,280 A | * | 1/1998 | Beckley et al. | 180/68.5 |

* cited by examiner

Primary Examiner—Brian L. Johnson
Assistant Examiner—Jeffrey J. Restifo
(74) Attorney, Agent, or Firm—Morrison & Foerster LLP

(57) ABSTRACT

An integrated system for providing the motive power for trucks working in a hazardous environment including an explosion-proof enclosure having a body receiving the battery system and a separate fuse box compartment to which the battery system is connected, and the truck electrical system is connected to the battery system through the fuse box compartment.

4 Claims, 8 Drawing Sheets

BATTERY ENCLOSURE SYSTEM FOR MOTIVE POWER IN HAZARDOUS SERVICE ENVIRONMENTS

BACKGROUND OF THE INVENTION

1. Field of the Invention

This invention relates to motive-powered vehicles and, more particularly, to vehicles such as fork lift trucks which operate in a hazardous environment and to cells and batteries serving as the motive power source for such trucks.

2. Description of the Prior Art

Lead-acid cells and batteries have been used in a variety of motive power applications in which an array of cells or batteries provides the motive power for vehicles ranging from Class 1 to Class 3 trucks, various automated guided vehicles, mining vehicles, and also railroad locomotives.

A variety of design circumstances for motive power applications serves to complicate the situation. In Class 1 and 2 trucks, i.e., electric rider trucks and electric narrow aisle trucks, respectively, the array of cells or batteries utilized have weight limits that must be met so as to provide the necessary counterbalance for the vehicle. Also, the physical space available for the motive power source in trucks is often limited.

The performance requirements for motive power vehicles are quite stringent. Motive power applications thus require relatively deep depths of discharge of the motive power source to be achieved on a continuing cycling basis over a period of time. Indeed, a common requirement for such trucks is that, in an 8-hour shift, the cell or battery assembly must be capable of delivering an 80% depth of discharge and that performance is required for about 300 cycles per year with a useful service life under these conditions of at least 4, and more typically 5, years.

Even further, many industries typically run three 8-hour shifts each day. The typical battery ratings are such that each battery is designed to be utilized for just one shift (typically being in service for about 6 hours or so). Because of the time involved in recharging lead-acid batteries, fork trucks which are used on a three-shift basis require three separate batteries. One battery is in service in the truck while two batteries are on charge.

The inventory burden involved becomes more significant for fork truck designed to work in a hazardous environment. Such environments require the use of a specially designed battery. Trucks and batteries operating in such hazardous environments have been termed "EX" trucks or batteries. To be suitable for such environments, EX batteries must comply with the appropriate safety standards, i.e., UL583. These standards require that the batteries have fully protected ventilation openings to limit access to the cell terminals from an outside source. Further, the current-carrying parts of the battery must be insulated or protected against possible contact with foreign objects when in use. Still further, the electrical connection in service (i.e., the running plug) must be interlocked with a switch so that the plugs can neither be inserted nor withdrawn while the receptacle contacts are live, or the plug must be locked in the receptacle to deter removal by unauthorized persons.

Accordingly, assembling EX batteries to meet such safety requirements involves providing the battery with an explosion-proof fuse box, switch, receptacle and a fully enclosed tray with a receptacle locking arm. These features require significant costs. These expenses become substantial when the service life of these specially designed batteries are compared with the typical 20-year service life of such electric trucks. Thus, over the 20-year service life of a fork truck, the user must purchase at least 12 specially-designed EX batteries. For service fleets having a relatively large number of trucks, the costs involved are multiplied, and even more substantial.

There is thus a need for a system which will satisfy the requirements for batteries used in hazardous environments in a reliable, yet more cost-effective, manner. It would accordingly be highly desirable to provide a system that would not require specially designed batteries.

It is accordingly a principal object of the present invention to provide a motive power system for trucks used in hazardous environments which allows the use of cells and batteries that do not have to be specially designed for such applications.

A further object of the present invention provides an explosion-proof enclosure designed for motive-powered trucks used in hazardous environments.

Yet another object of this invention is to provide a system for satisfying the safety requirements for motive-powered trucks working in a hazardous environment while utilizing cells and batteries of conventional configurations.

These objects and advantages of the present invention are apparent from the following description and drawings.

SUMMARY OF THE INVENTION

In its broadest aspects, the present invention provides an integrated system for providing the motive power for trucks working in a hazardous environment without requiring the use of expensive, specially designed batteries that individually satisfy the various safety requirements. The present invention thus provides an explosion-proof enclosure designed to accept a conventional battery as an interchangeable part. The enclosure has all of the required safety features and is configured to accept a standard battery.

DETAILED DESCRIPTION OF THE INVENTION

Figure 1:
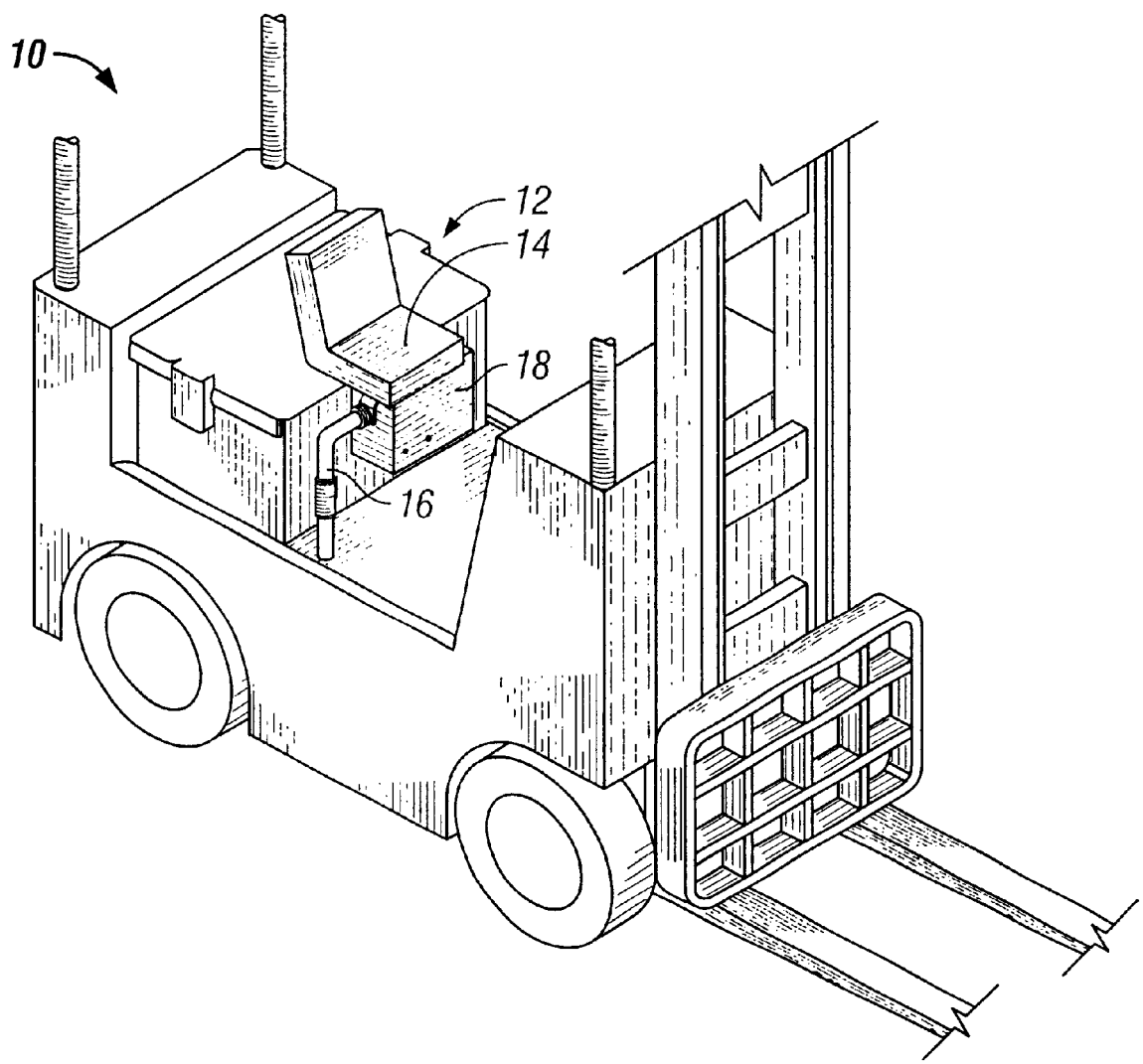
FIG. 1 is an isometric view showing a motive-powered truck with the explosion-proof enclosure and battery used in the present invention.

FIG. 1 shows an exemplary motive-powered vehicle, here a fork lift truck, shown at 10. The explosion-proof enclosure and battery of the present invention, shown generally at 12, are located so as to provide a counterbalance for the vehicle 10. Thus, as is shown, the explosion-proof enclosure and battery combination employed in this invention is positioned on the vehicle 10 under, and largely in back of, the driver's seat 14. In general, the electrical connections between the vehicle 10 and the enclosure and battery system 12 are made via conduit 16 to the fuse box 18 as will be discussed hereinafter.

Figure 5:
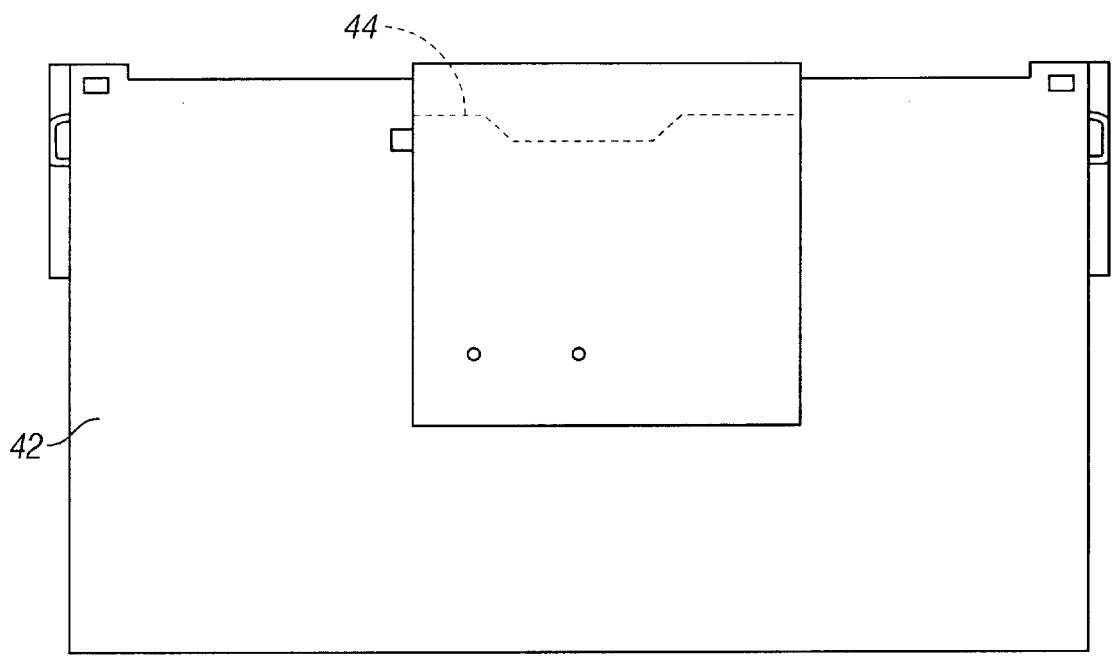
FIG. 5 is a front elevation view of the enclosure.

In accordance with a principal aspect of the present invention, the explosion-proof enclosure and battery system of the present invention allows use of conventional batteries for powering the vehicle by the use of an enclosure containing the necessary safety structure. To this end, and as seen in FIGS. 2, 3, and 5, the illustrative embodiment of the explosion-proof enclosure and battery system 12 comprises an enclosure shown generally at 20 in which a tray 22 containing the battery shown generally at 24.

As to the tray 22, any configuration desired can be utilized. The principal functions require that the tray 22 have adequate strength to allow transporting of the battery and lifting the battery 24 in and out of the vehicle 10. Because of the weight of the battery 24, it is preferred to include tray lift structure to facilitate mechanical movement of the tray, particularly for loading into and out of the enclosure 20 or the vehicle 10. Such lift structure can be adequately provided by forming the tray 22 with lift ears 26 (FIGS. 2 and 3).

Figure 2:
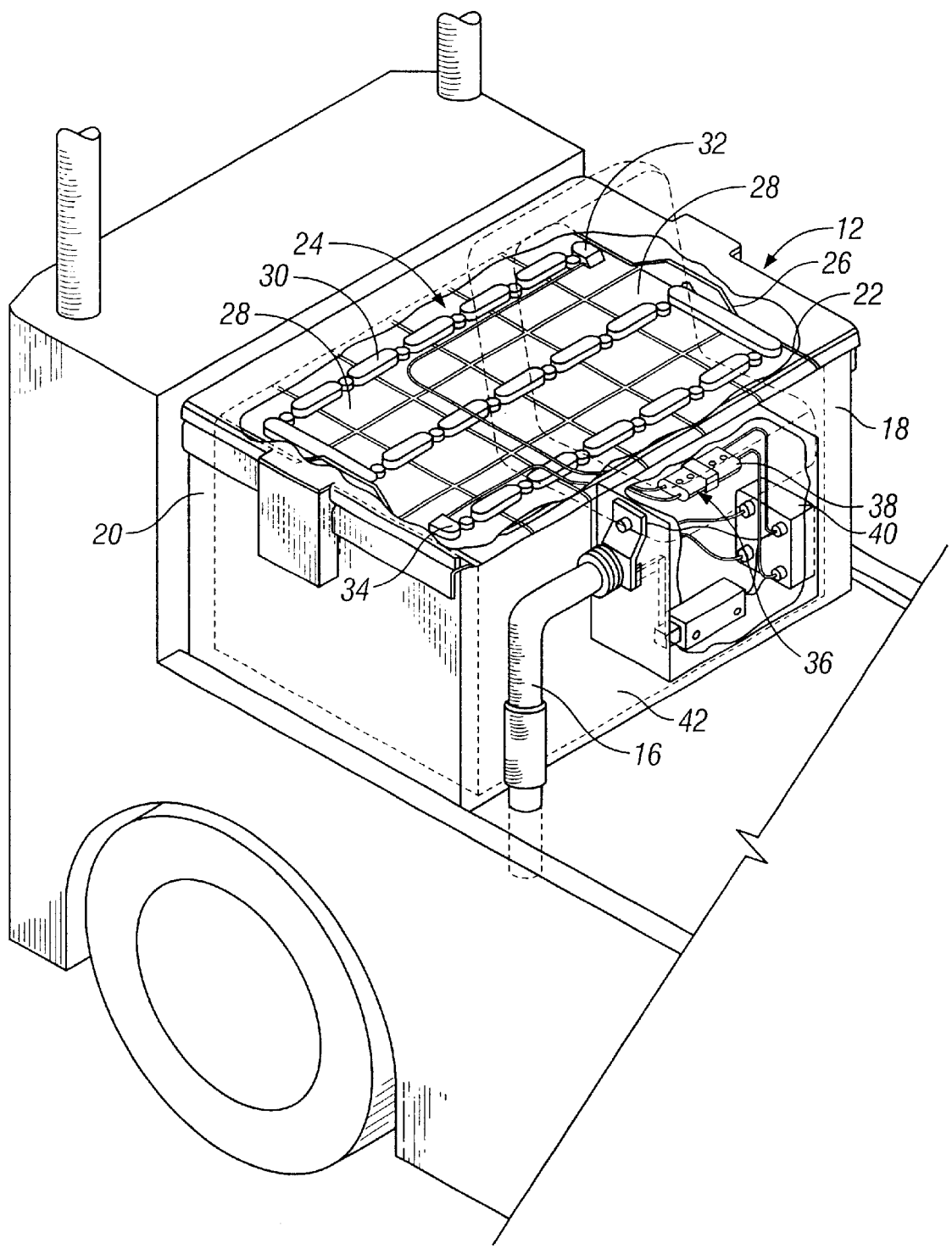
FIG. 2 is an isometric view similar to FIG. 1 and having the cover of the enclosure broken away to show the battery contained therein and the explosion-proof features associated with the enclosure.
Figure 3:
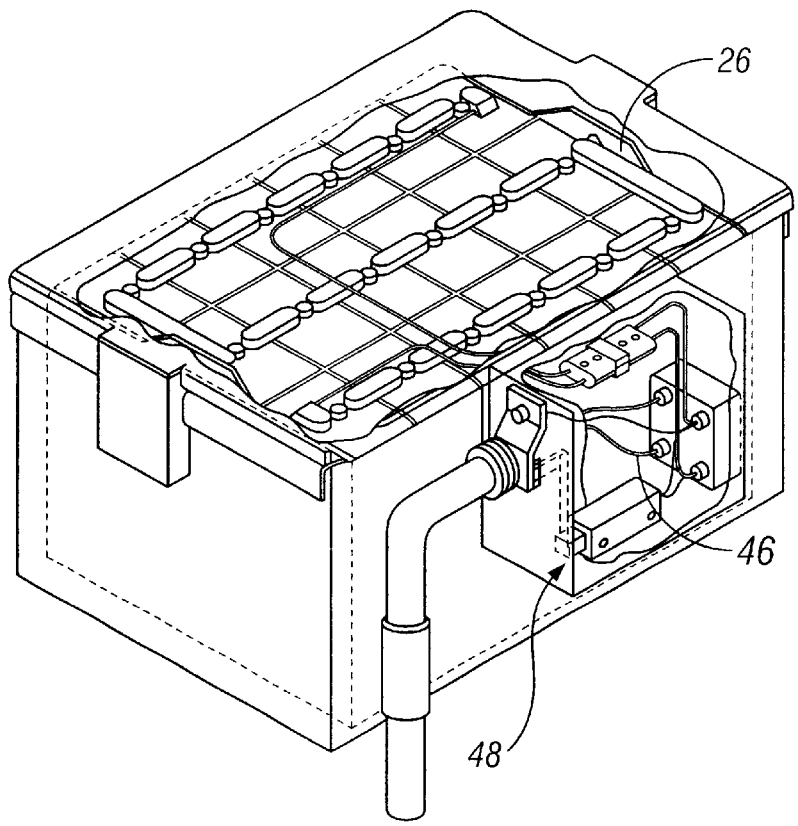
FIG. 3 is an isometric view similar to FIG. 2 and further showing the explosion-proof container.

Further, the enclosure 20 and the tray 22 should be complementally sized so that the tray 22 is spaced sufficiently from the internal walls of the enclosure 20 to provide the necessary ventilation (as shown in FIGS. 2 and 3). More particularly, ventilation should be adequate to prevent the accumulation of flammable or toxic gases or vapors within the battery assembly, as is known.

One aspect of the present invention is that the battery 24 is of a standard design. Thus, in the illustrative embodiment, the battery 24 comprises 18 cells 28 electrically connected together by connectors 30.

As one illustrative example of a suitable cell 30, a lead-acid conventional flooded electrolyte cell can be used. For forklift trucks of this type, the nominal rated capacity of a suitable cell, as one example, is 85 Ampere Hours. In general, the battery 24 itself should have the following nominal capacity, as one example: 36 Volts, 935 Ampere Hours and 32.8 Kilowatt-Hours.

As may thus be appreciated, an important aspect of the present invention is that the battery 24, or the individual cells 28, can be readily replaced without replacing the enclosure 20. Given the useful service life of the battery 24, and the potential incidence of even premature failure, the ability to use batteries of a conventional design is significant.

Another aspect of the present invention thus comprises the ability to readily connect the battery 24 to the necessary explosion-proof fuse, suitable fuses being known and available. Indeed, and more preferably, the one part of the connections to the battery can be made during the pre-wiring of the battery by the manufacturer when the unit is provided as such. Replacement batteries obviously require installation in the field. To this end, and as best seen in FIGS. 2 and 3, the appropriate electrical connection is made by having a plug having two leads, lead 32 being connected to the positive terminal of the battery 24 while the other lead 34 being connected to the negative terminal. The other end of the plug, indicated at 36, is connected into fuse box 18 to plug 38 which is connected to fuse box 40. Suitable plugs are available and may be used. An example of such a plug are Anderson Power Products "SB" Connectors, No. 63256 (Sterling, Mass.).

As best seen in FIG. 5, the enclosure 20 front wall is undercut as indicated in phantom in FIG. 5 at 44 to allow ready installation of the battery 24 in the field. Thus, when the appropriate end of the plug has been connected to the positive and negative terminations, all that is needs to be done is to assemble the other end of the plug 36 into plug 38 in the enclosure fuse compartment box 18.

Completion of the system 12 involves leads 46 and a switch 48 which terminate in an electrical receptacle. Suitable switches and receptacles are known. The connection to the vehicle 10 will be described hereinafter.

As to the enclosure 20, and as is shown in the illustrative embodiment in FIGS. 5–8, the enclosure 20 comprises a body 50 having a base 52, an upstanding front wall 42 and back wall 54 and side walls 56. The enclosure 20 is completed by a cover 58.

As may be appreciated, in addition to being complementally sized relative to the battery tray 22 and having the adequate strength, the enclosure 20 must be configured to fit into the area of the vehicle 10 designed for the motive power source. Further, and importantly, the location of the enclosure fuse box compartment 18 should be positioned relative to the vehicle electric plug so as to allow ready connection thereto during installation and use.

Figure 4:
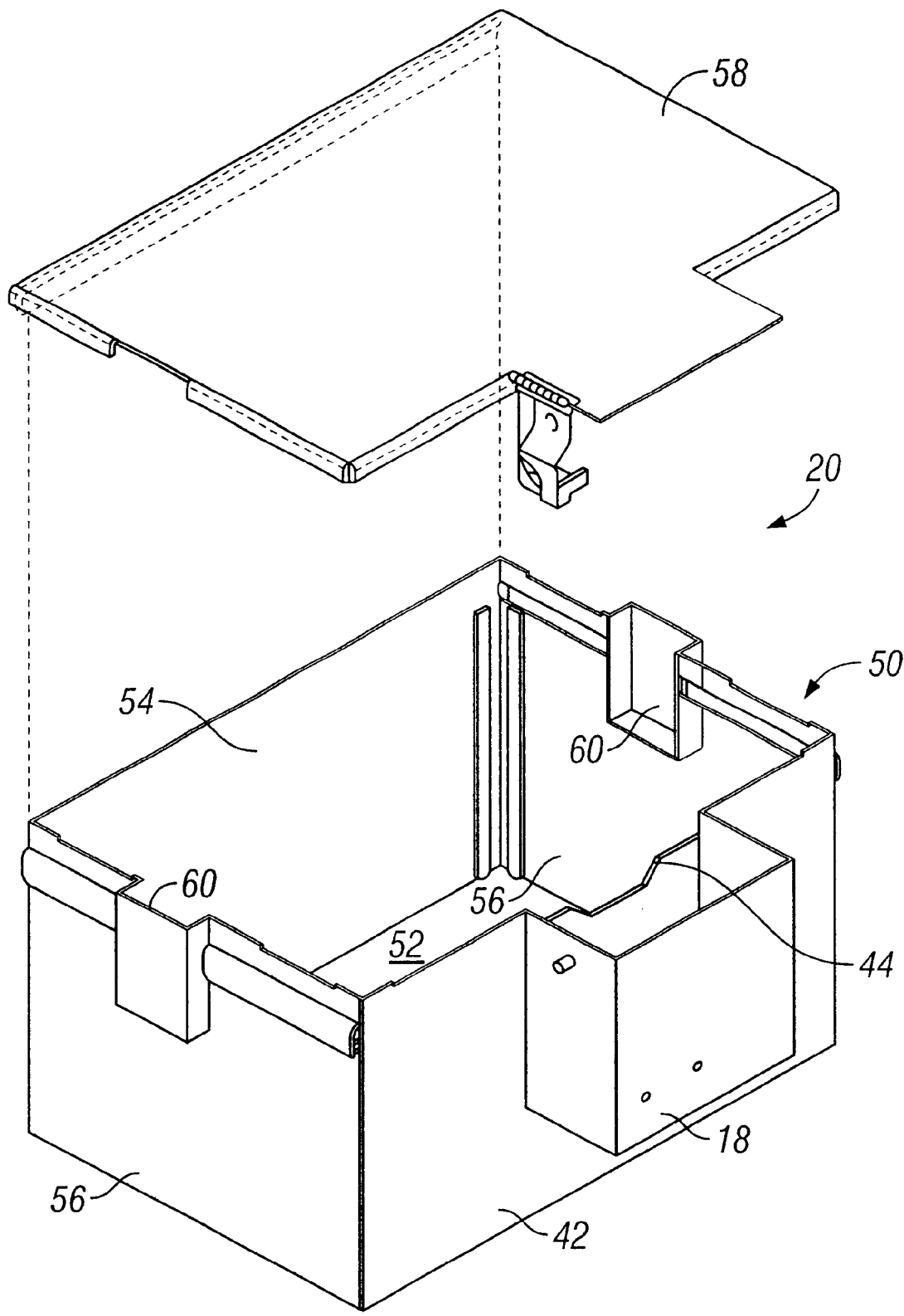
FIG. 4 is an exploded, isometric view of the enclosure and illustrating the components of the enclosure.
Figure 6:
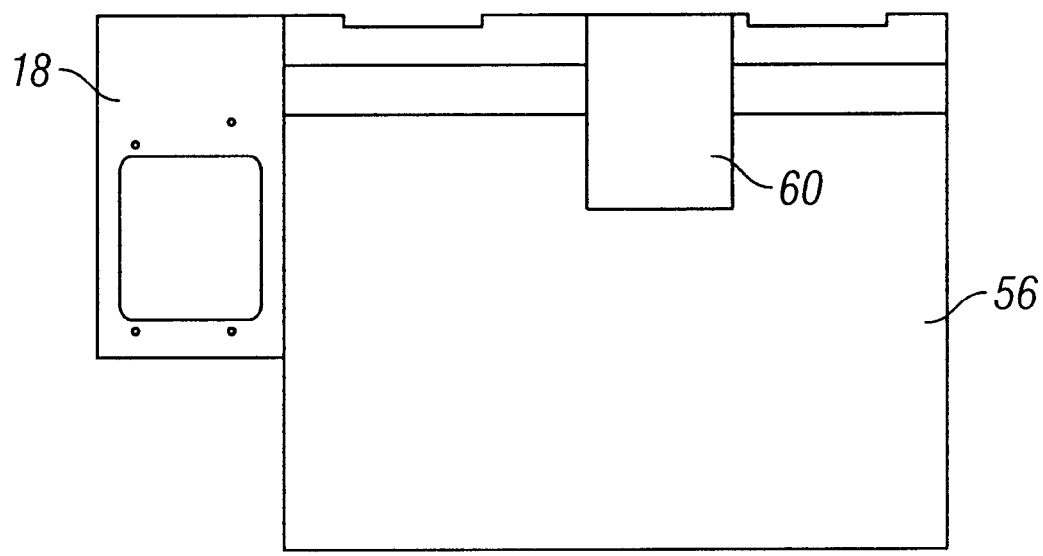
FIGS. 6 and 7 are side elevation views taken, respectively, from the right and left sides of the enclosure as shown in FIG. 3.
Figure 7:
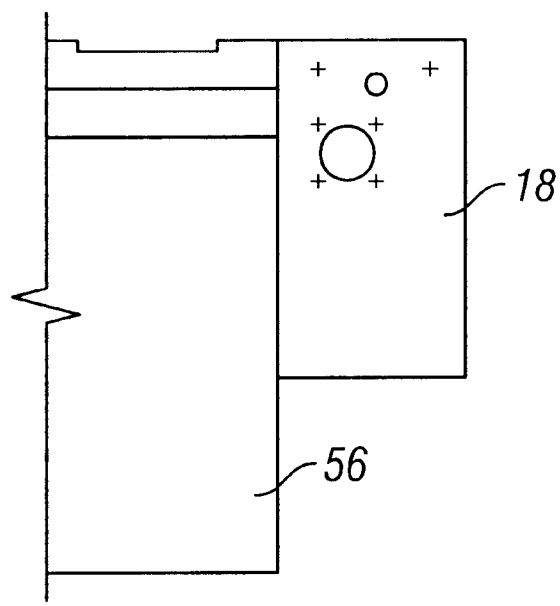

Even further, and according to a preferred aspect of the present invention, the enclosure 20 should desirably include structure allowing the enclosure and battery system to be lifted in and out of the vehicle 10. As seen in FIGS. 2–4, such suitable structure can comprise lift areas 60, most preferably positioned at, or adjacent, the center of gravity of the explosion-proof enclosure and battery system 12.

Figure 8:
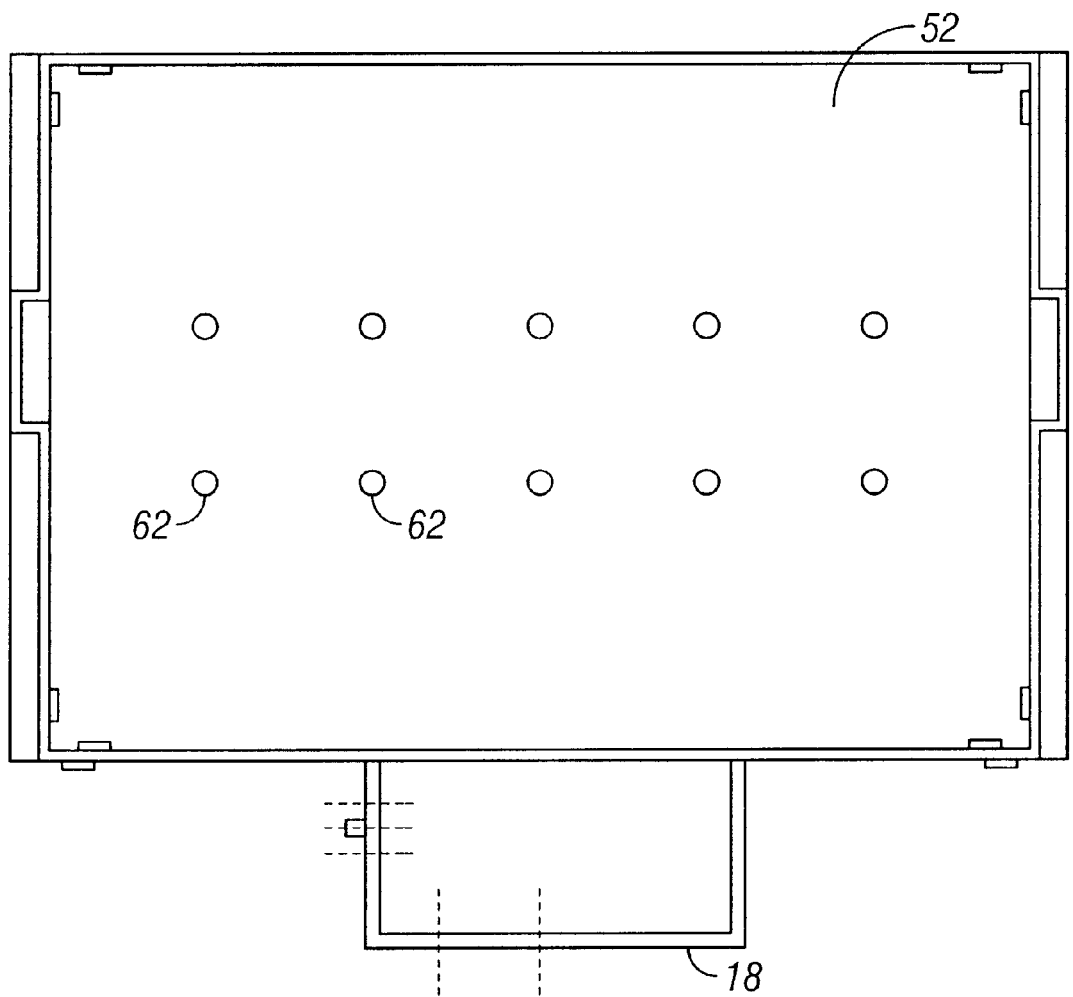
FIG. 8 is a bottom plan view showing the bottom of the enclosure.
Figure 9:
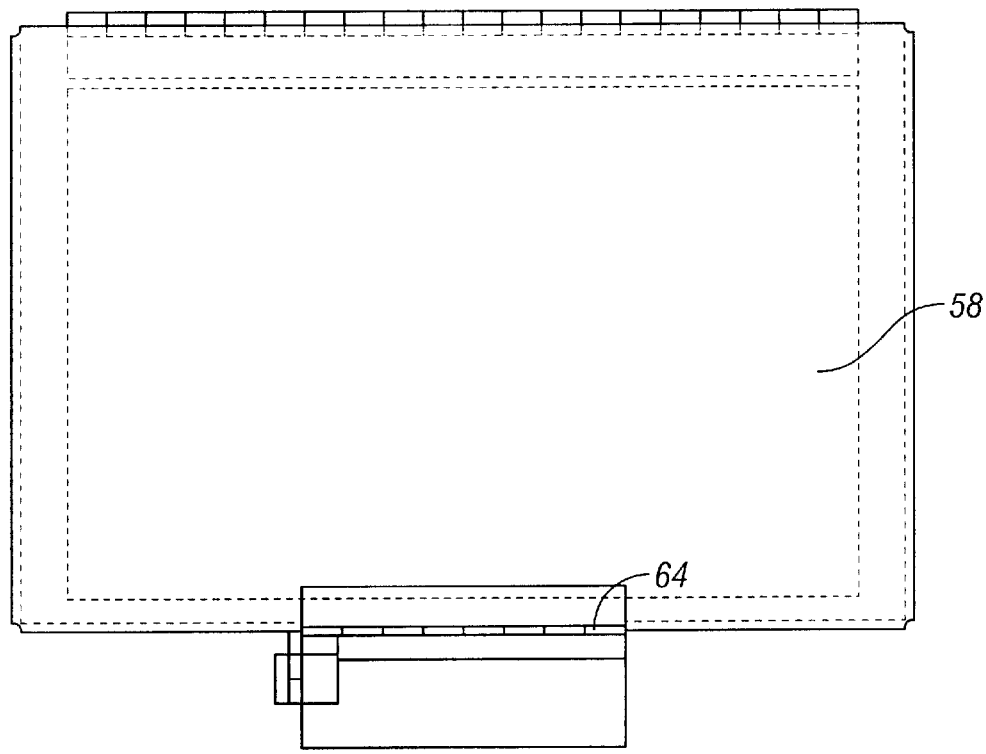
FIG. 9 is a top view of the cover of the enclosure.
Figure 10:
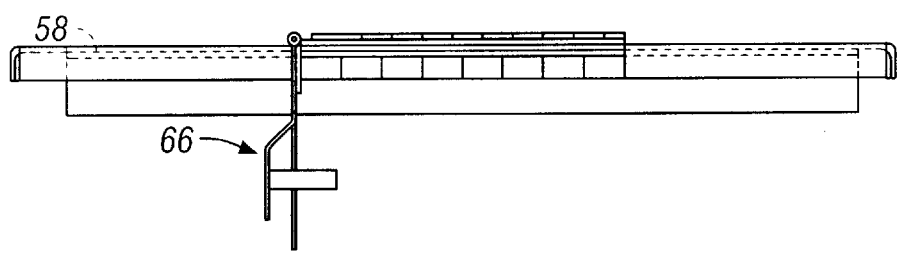
FIG. 10 is a front elevation view of the cover as shown in FIG. 9.
Figure 11:
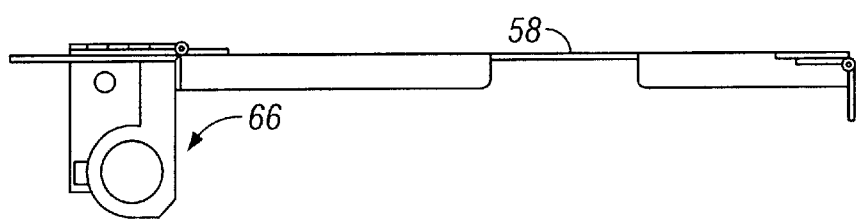
FIG. 11 is a side elevation view of the cover.
Figure 12:
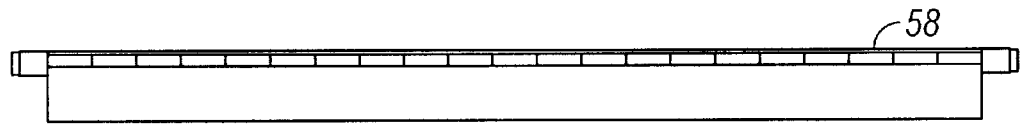
FIG. 12 is a rear elevation view of the cover.

If desired, and as is shown in FIG. 8, drain holes 62 can be provided. This allows electrolyte or other liquid to be removed from the enclosure.

Figure 13:
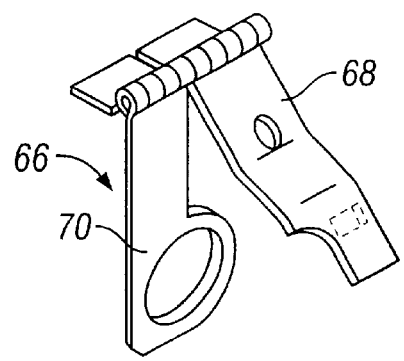
FIG. 13 is an isometric view of the dual flap mechanism used in the connection between the explosion-proof battery enclosure system of the present invention and the vehicle.
Figure 14:
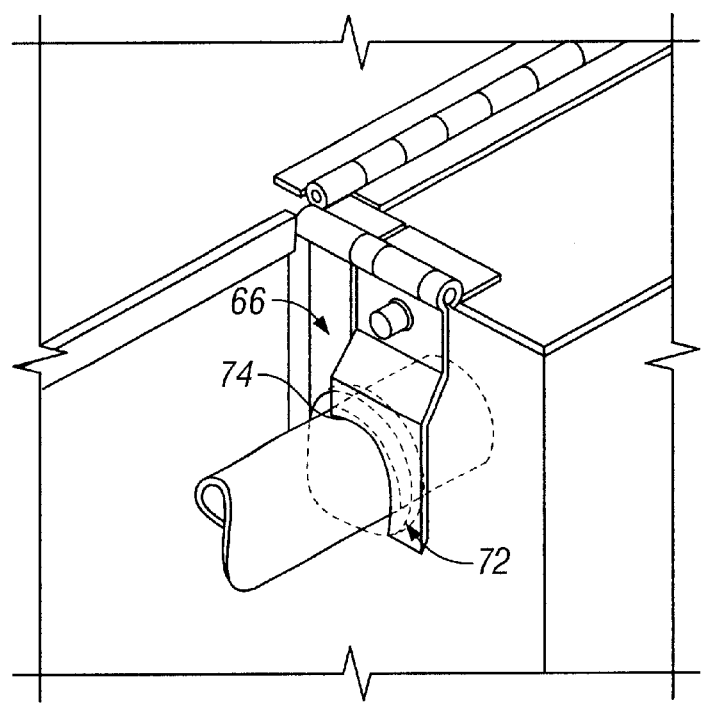
FIG. 14 is a partial isometric view showing the dual flap, the cover portion to which the dual flap is attached, and the side of the enclosure.

A further aspect of the invention provides an arrangement in service so that when the vehicle is being powered, the appropriate electrical connections can neither be inserted nor withdrawn while the contacts are live. To this end, and as is shown in FIGS. 9–14, the cover 58 is preferably a two-piece configuration having a hinge 64 separating the fuse box 18 from the interior enclosure box. Further, and importantly, the cover 18 includes a dual locking flap 66 (as best seen in FIGS. 13 and 14) comprising a primary flap 68 and a secondary flap 70. The primary flap 68 controls the switch 48 such that, when the primary flap is disengaged as shown in FIG. 13, the switch deactivates. No electrical power is then provided for the truck 10. The secondary flap 70 prevents the cover 58 from being opened if the primary flap 68 and the plug disengage.

As seen in FIG. 14, the switch and electrical leads are connected to a receptacle 72 which, in turn, is connected to plug 74.

To prolong the life of the enclosure, the entire enclosure may be powder coated with an acid resistant material. Suitable powder coatings are known and may be used.

Additionally, guides of high density polypropylene or the like may be used to prevent scratches to the enclosure when loading.

Desirably, and as has been alluded to herein, the enclosure 20 is assembled with the battery and other components in place and wired as necessary to provide the requisite electrical capacity when initially sold as a unit. The sole exception to the assembly involves the cable leads from the fuse box.

In the field, the enclosure and battery system 12 is mounted into the truck 10. This can be accomplished by lowering the system into the area of the truck for the motive power source using an overhead hoist. The two plugs are then connected, the cover closed, the flap placed in position with the truck receptacle and the keyed padlock is installed to secure assembly.

Thus, as has been seen, the present invention involves a system for providing the motive power source for forklift trucks and the like which operate in a hazardous environment and require explosion-proof safety features in a cost-effective and efficient way. No specially designed battery or cells are required. Standard battery and cell designs may be used and can be readily replaced upon failure.

I claim:

1. A motive-powered truck for hazardous environments having an area for receiving a motive power source and an electrical connector for electrically connecting the truck and a motive power source which comprises an explosion-proof enclosure comprising a body having a base, side walls, a back wall, a front wall and a cover, said body defining an area for receiving a plurality of lead-acid batteries electrically connected together to provide the motive power for said truck and having a positive and negative terminal, said batteries not satisfying the safety standards for service in hazardous environments, and a fuse box compartment adjacent the front wall of said body having a fuse box, a switch and leads therefrom to an electrical receptacle, the truck electrical connection being connected to said electrical receptacle, and said motive power, positive and negative terminals being electrically connected to said fuse box.

2. The truck of claim 1 wherein said fuse box compartment is separate from said enclosure, integral with said front wall, at least part of said front wall being undercut to provide a path between said body and said fuse box compartment, and the electrical connections between the positive and negative terminals being through the undercut part of said front wall.

3. The truck of claim 1 wherein said batteries are flooded electrolyte lead-acid batteries.

4. The truck of claim 1 wherein said fuse box compartment has a cover having a primary flap which deactivates said switch when said primary flap is disengaged and a secondary flag which prevents said fuse compartment box cover from being opened when said primary flap and said electrical receptacle disengage.

* * * * *